No. 884,767. PATENTED APR. 14, 1908.
F. B. SENSENEY.
COOKING UTENSIL.
APPLICATION FILED JAN. 30, 1908.

UNITED STATES PATENT OFFICE.

FANNIE B. SENSENEY, OF CHAMBERSBURG, PENNSYLVANIA.

COOKING UTENSIL.

No. 884,767.  Specification of Letters Patent.  Patented April 14, 1908.

Application filed January 30, 1908. Serial No. 413,339.

*To all whom it may concern:*

Be it known that I, FANNIE B. SENSENEY, a citizen of the United States of America, residing in Chambersburg, Franklin county, State of Pennsylvania, have invented certain new and useful Improvements in Cooking Utensils, of which the following is a specification, reference being had therein to the accompanying drawings.

My invention relates to cooking utensils, and its object is to provide a device which may be used either as a pan or griddle.

To this end my invention consists of a double ended pan the vertical sides of the two ends of which are of different heights.

Figure 1:
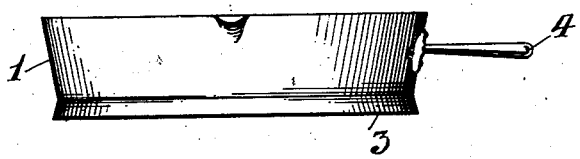
Figure 2:
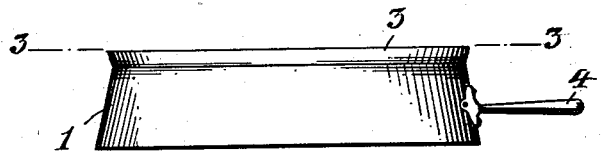
Figure 3:
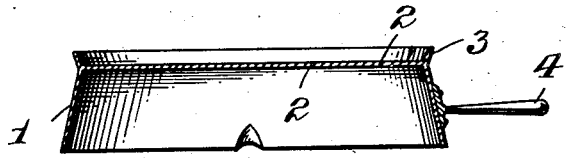

A form of my invention is illustrated in the accompanying drawings in which similar figures of reference indicate similar parts throughout the various views, of which:

Figure 1 is a side view; Fig. 2 is a similar view, the device being reversed; and Fig. 3 a sectional view on the line 3—3 of Fig. 2.

1 is the wall of an ordinary fry or sauce pan, and 2 the bottom. The wall 1 is extended below the bottom 2 so as to form a comparatively low wall or ridge 3 around the reverse side of bottom 2. This wall 3 should be of sufficient height to enable the utensil to be used as a griddle.

4 is a handle adapted for use with either end of the device uppermost. It will readily be understood that when the wall 1 is uppermost, the device may be used as a fry or sauce pan, and that when the wall 3 is uppermost, the device may be used as a griddle.

What I claim and desire to secure by Letters Patent is:

1. A cooking utensil consisting of walls of different heights, each surrounding the opposite face of a common bottom and adapted to be used as a fry pan or a griddle, according as the higher or lower surrounding wall is uppermost.

2. A cooking utensil consisting of walls of different heights, each surrounding the opposite face of a common bottom and adapted to be used as a fry pan or a griddle, according as the higher or lower surrounding wall is uppermost, and a handle located approximately mid-way between the upper and lower edges of said walls and adapted for use with either end of the device uppermost.

In testimony whereof, I have hereunto set my hand, this 28th day of January, nineteen hundred and eight.

FANNIE B. SENSENEY.

In presence of—
  HAROLD W. CORNELL,
  HENRY E. GANDY.